United States Patent [19]

Melen et al.

[11] Patent Number: 5,781,659

[45] Date of Patent: Jul. 14, 1998

[54] OCR CLASSIFICATION BASED ON TRANSITION GROUND DATA

[75] Inventors: Roger D. Melen, Los Altos Hills; Hadar Avi-Itzhak, Mountain View, both of Calif.

[73] Assignee: Canon Inc., Tokyo, Japan

[21] Appl. No.: 794,964

[22] Filed: Feb. 4, 1997

Related U.S. Application Data

[63] Continuation of Ser. No. 430,109, Apr. 27, 1995, abandoned, which is a continuation of Ser. No. 112,133, Aug. 26, 1993, abandoned.

[51] Int. Cl.$^6$ .............................. G06K 9/00; G06K 9/62; G06K 9/48
[52] U.S. Cl. ...................... 382/187; 382/194; 382/200; 382/218
[58] Field of Search ........................ 382/209, 217, 382/218, 224, 226, 200, 194, 228, 187, 155

[56] References Cited

U.S. PATENT DOCUMENTS

| | | | |
|---|---|---|---|
| 4,319,221 | 3/1982 | Sakoe | 382/36 |
| 4,556,985 | 12/1985 | Hongo . | |
| 4,672,678 | 6/1987 | Koezuka et al. | 382/30 |
| 5,060,278 | 10/1991 | Fukumizu | 382/38 |
| 5,119,438 | 6/1992 | Ueda et al. | 382/37 |
| 5,212,741 | 5/1993 | Barski et al. | 382/18 |

FOREIGN PATENT DOCUMENTS

| | | | |
|---|---|---|---|
| 0 463 242 A1 | 1/1992 | European Pat. Off. | G06K 9/64 |
| 0 552 704 A2 | 7/1993 | European Pat. Off. | G06K 9/36 |
| 2 173 026 | 10/1986 | United Kingdom | G06K 9/62 |

OTHER PUBLICATIONS

Lui, Ho C., et al., "Character Recognition on Gray Level Image Using Neural Networks," *1991 IEEE International Joint Conference on Neural Networks*, Nov. 18–21, 1991, Singapore, pp. 325–330.

T. Pavlidis, et al., "Recognition of Poorly Printed Text by Direct Extraction of Features from Gray Scale," *Machine Vision Applications in Character Recognition and Industrial Inspection*, SPIE, vol. 1661, Feb. 10–12, 1992, San Jose, California, pp. 118–126.

Theo Pavlidis, "Recognition of printed text under realistic conditions," *Pattern Recognition Letters 14*, Apr. 1993, Netherlands, pp. 317–326.

Theo Pavlidis, "Recognition of Printed Text Under Realistic Conditions", *Proceedings of the Second IPTP Conference*, Tokyo, Japan, Jan. 1992, pp. 65–76.

T. Pavlidis, L. Wang, J. Zhou, W. J. Sakoda, and J. Rocha, "Recognition of Poorly Printed Text by Direct Extraction of Features from Gray Scale", *Machine Vision Applications in Character Recognition and Industrial Inspection*, SPIE vol. 1661 (10–12 Feb., 1992), pp. 118–126.

*Primary Examiner*—Joseph Mancuso
*Assistant Examiner*—Gerard Del Rosso
*Attorney, Agent, or Firm*—Fenwick & West LLP

[57] ABSTRACT

An OCR system 10 classifies an input image vector of an unclassified symbol with respect to a library 14T of template image vectors of pre-classified characters. Each template vector is in the form of a sequence of elements representing the image intensity level of a pixel within the character defined by that template vector. Each template element is part of the image background, foreground, or transition ground between the background and foreground. Each input vector, like the template vectors, is also in the form of a sequence of elements. However, in the input vector, each element represents the sum or an image intensity level signal component defining the symbol within the image of the unclassified symbol plus a greyscale noise component. Each input element is also part of the background, foreground, or transition ground. The input vector and at least one of the template vectors are entered into a classifier device 18. The input vector is classified based on the backgrounds, foregrounds, and transition grounds. The presence of transition ground in the input vector and the template vector produces a robust classification response with a more uniform correlation coefficient between repeated classifications of the same input symbol. The classifier device may be a distance function classifier or a neural network classifier.

36 Claims, 4 Drawing Sheets

OCR CLASSIFICATION BASED ON TRANSITION GROUND DATA

This is a continuation of U.S. patent application Ser. No. 08/430,109 filed on Apr. 27, 1995, which was a continuation of U.S. patent application Ser. No. 08/112,133 filed on Aug. 26, 1993, now abandoned.

TECHNICAL FIELD

This invention relates to OCR classification of input images against a library of template images, and more particularly to such classification employing transition ground data (greyscale signal) along with background data and foreground data (binary signal).

BACKGROUND

Heretofore, unclassified input images and pre-classified template images were digitized to eliminate the greyscale context of the underlying data. The resulting binary inputs and templates were "clean" images with minimum data to be processed. These prior art systems were generally slow by today's standards with limited memory. Greyscale was treated as noise not signal.

Digitization of the images eliminated the greyscale noise, along with the greyscale signal (transition ground data). Transition ground is the thin region of variable intensity along the edge within an image between the background region and the foreground region. The level of the transition ground signal progressively changes from background level to foreground level. Transition ground, like greyscale noise, forms part of the non-binary content of the image, and is lost during digitization.

The removal of greyscale noise permitted the classification process to provide higher correlation coefficients. Greyscale noise was generally non-reproducible between repeated classification of the same character, and merely detracted from the proper match of the input symbol with the templates. Unfortunately, the resulting classification response of these prior binary systems was "brittle" due to the loss of transition ground signal. The correlation coefficient was based on a suitable distance criterion such as the "Hamming" distance between the input symbol and the matching template. The distance and resulting correlation coefficients were non-uniform between repeated classifications of the same printed image.

SUMMARY

It is therefore an object of this invention to provide an OCR classification method which employs background and foreground binary data and transition ground greyscale data.

It is another object of this invention to provide such OCR classification method which has a "robust" response with less variation in correlation coefficients between classifications of the same input symbol.

It is a further object of this invention to provide such OCR classification method which minimizes loss of image signal.

It is a further object of this invention to provide such OCR classification method in which greyscale noise beyond the background level (or beyond the foreground level) is "clamped" to the background level (or to the foreground level).

It is a further object of this invention to provide such OCI classification in which greyscale noise near the background level (or near the foreground level) is "clamped" to the background level (or to the foreground level).

It is a further object of this invention to provide such OCR classification in which the background level (or foreground level) is a predetermined number of amplitude levels from the limiting level of the background amplitude level (or foreground amplitude level).

Briefly, these and other objects of the present invention are accomplished by providing an OCR method of classifying an input image vector of an unclassified symbol with respect to a library of T (where T is a positive integer) template image vectors of pre-classified characters. Each of the template vectors is in the form of a sequence of elements each having a numerical value (amplitude or level) representing the image intensity level of that element within the pre-classified character defined by that template vector. The template elements are either from the background region or the foreground region of the character image, or from the image transition ground region between the background and foreground caused by the progressive change within the image from background intensity level to foreground intensity level. The input vector is also in the form of a sequence of elements each having a numerical value representing an image intensity level signal component defining the symbol within the image of the unclassified symbol. In addition, the input vector has a greyscale noise component superimposed on the image intensity level signal component on an element-by-element basis. The input elements are also either from the background or the foreground of the character image, or from the image transition ground between the background and foreground. The input vector and at least one of the T template vectors are entered into a classifier device. The input vector is then classified with respect to the entered template vectors by comparing the background and foreground and transition ground of the input vector with the background and foreground and transition ground of the entered template vector. In addition, the elements of the input vector may be identified which have a numerical value within a predetermined background clamping range of numerical values. The numerical value of each of the identified elements may then be clamped to a predetermined background clamping numerical value.

BRIEF DESCRIPTION OF THE DRAWINGS

Further objects and advantages of the present classification method and the operation of the steps therein will become apparent from the following detailed description and drawings (not drawn to scale) in which.

Figure 1:
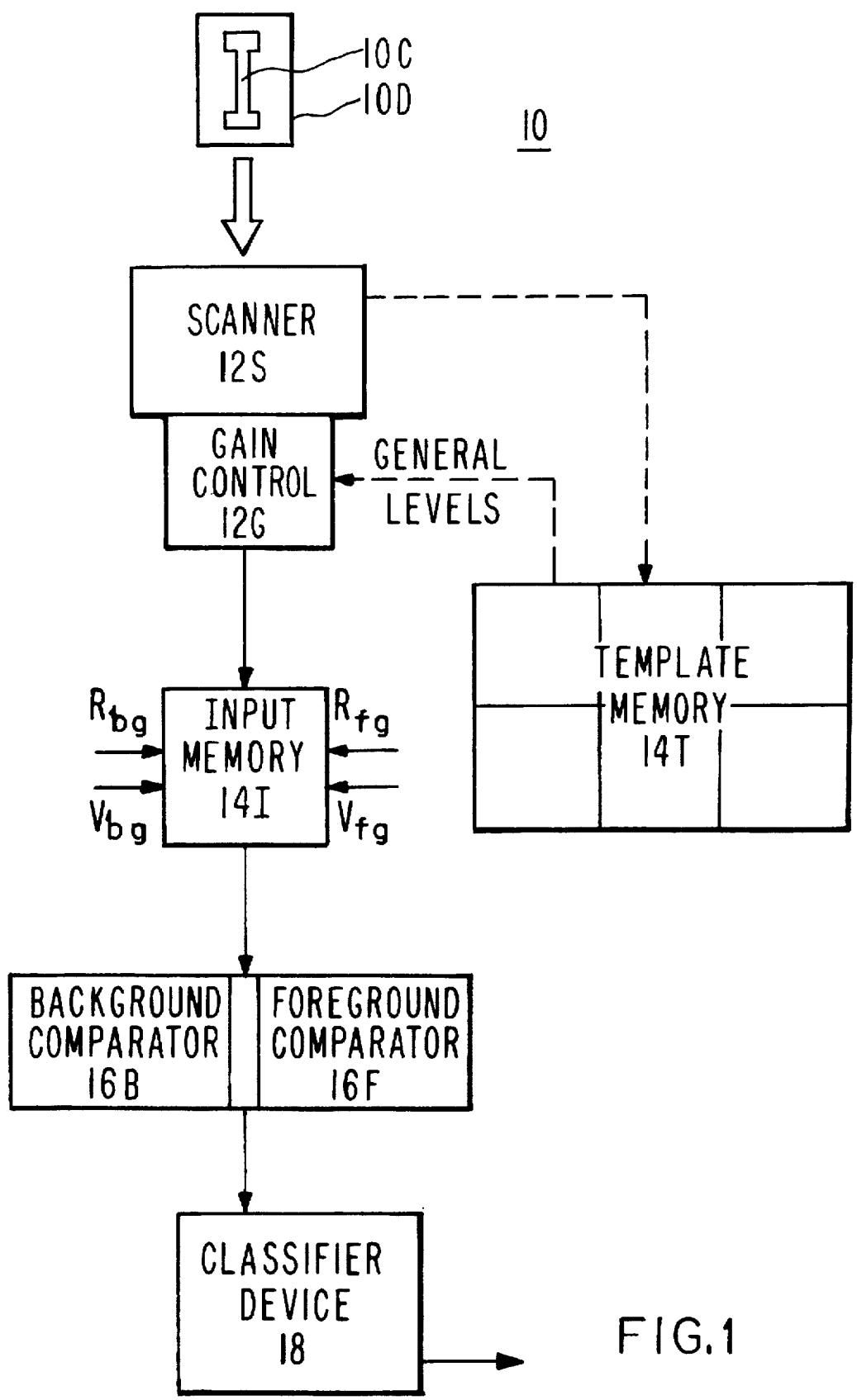
FIG. 1 is a block diagram of an OCR classification system showing the device required for each step of the classification method.

The first digit of each reference numeral in the above figures indicates the figure in which that element is shown.

3

The second digit indicates related structural elements. The final letter indicates a sub-portion of an element.

Figure 2:
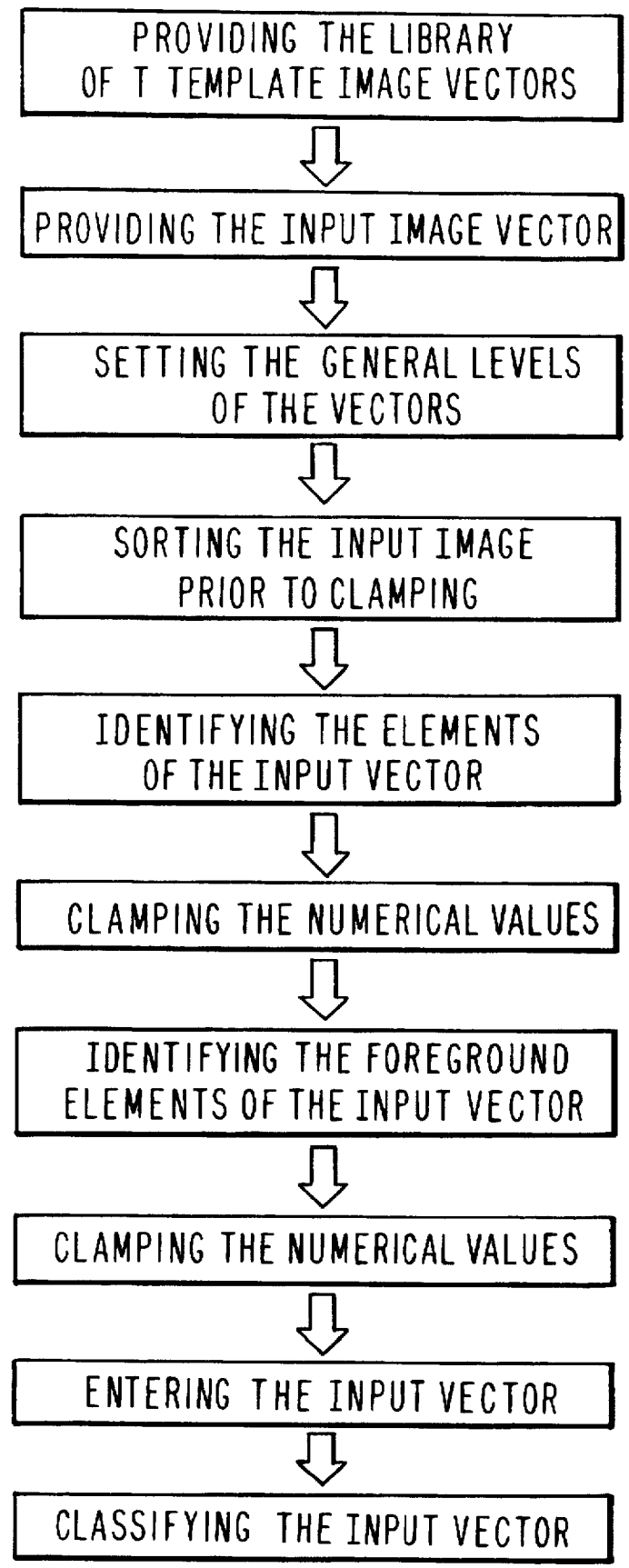
FIG. 2 is a flow chart showing the basic steps of the classification method.
Figure 3A:
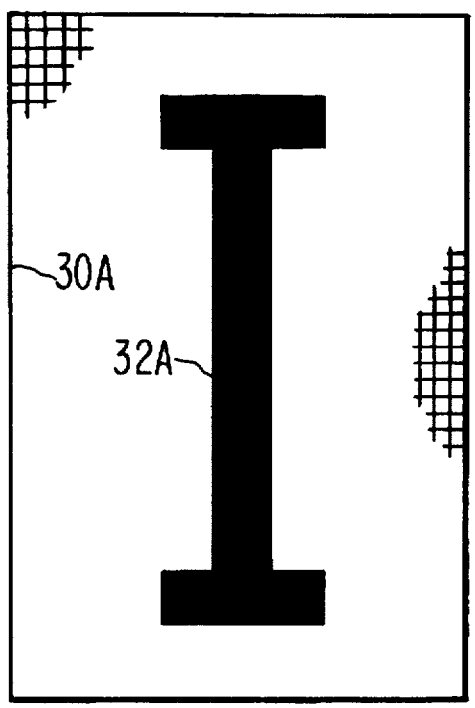
FIG. 3A is a diagram of a template pixel image in binary of the template character "T"
Figure 3B:
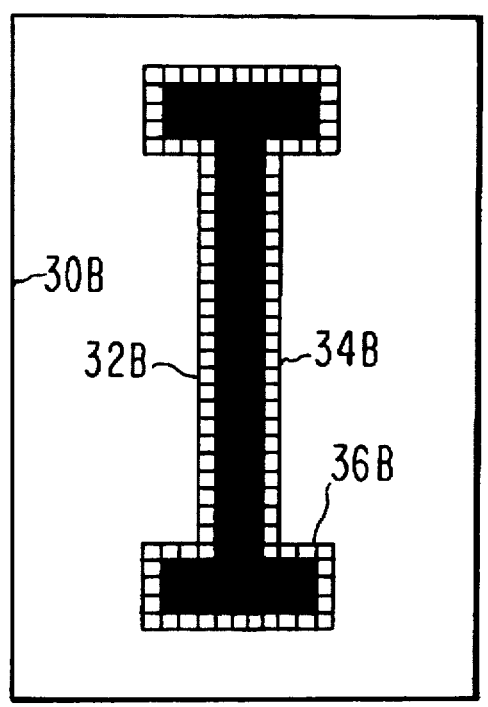
FIG. 3B is a diagram of a template pixel image in greyscale of the template character "T" with a simple transition ground one pixel wide.
Figure 3C:
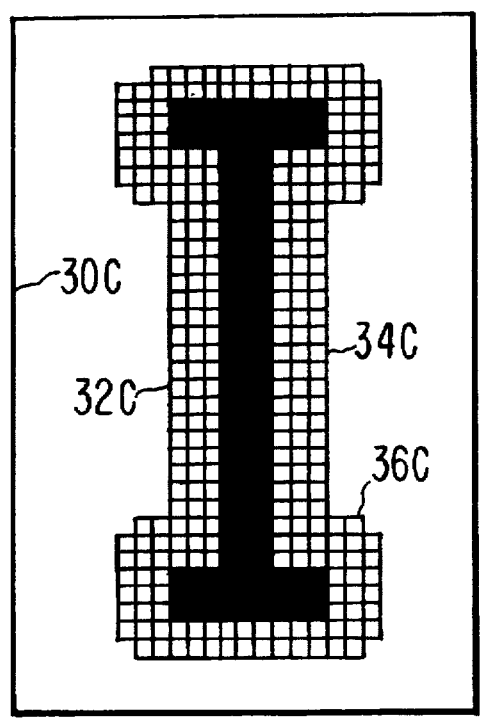
FIG. 3C is a diagram of a template pixel image in greyscale of the template character "T" with a complex transition ground having various widths.
Figure 3D:
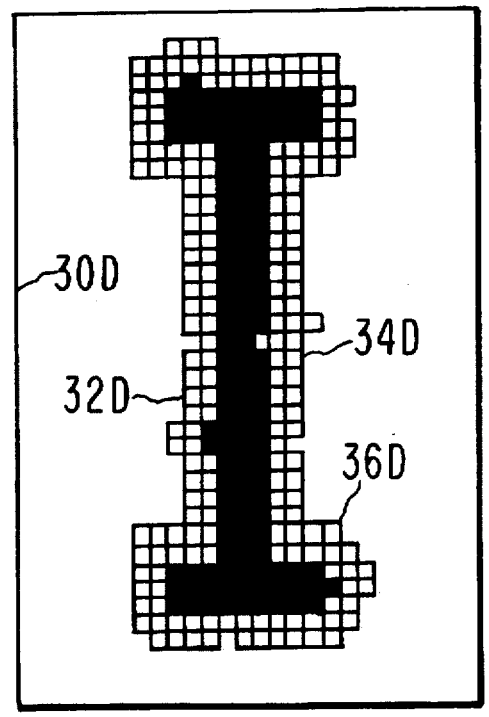
FIG. 3D is a diagram of an input pixel image in greyscale of the input character "T" with a noisy transition ground.

GENERAL EMBODIMENT (FIGS. 1 and 2)

An OCR system 10 for classifying an input image vector of an unclassified symbol with respect to a library of T template image vectors of pre-classified characters is shown in FIG. 1. An image vector is a mathematical format of a pixel image commonly stored in a bit map memory (see FIGS. 3A–D). Each element of the vector represents the image intensity amplitude or level of a date pixel in the bit map. The basic steps of the underlying classification method are listed in FIG. 2, and described in detail below.

Providing the library of T template image vectors. The template vectors may be generated by scanning a set of images of the corresponding character through image scanner 12S forming a pixel image in template memory 14T. Each template vector may be a statistical composite of many (perhaps thousands) of samples of the underlying character. The sample population base may include a range of fonts of the underlying character. Alternatively, each template vector may be created directly as a pixel image in the template memory by manually entering or deleting digital data coordinate by coordinate to provide a model template. Each template vector is in the form of a sequence of elements, with each element having a numerical value representing the image intensity level of a pixel within the pre-classified character defined by that template vector. Each element is either part of:

the image background region, or the image foreground region, or the image transition ground region between the background and foreground.

Transition ground is a result of the progressive change from background level to foreground level as each leading edge within an image is encountered during scanning (see Transition Ground section). The transition ground progressively changes from foreground level back to background level along each trailing edge.

Providing the input image vector of the unclassified symbol. The input vector may be generated by scanning the printed image of the unclassified input character 10C on input document 10D through image scanner 12S into input memory 14I. The input vector, like the template vectors, is also in the form of a sequence of elements, each element having a single numerical value. However, in the input vector, the numerical value of each input element represents the sum of an image contrast level signal component defining the symbol within the intensity of the unclassified symbol and a greyscale noise component. Each element is either part of the image background region, or the image foreground region, or the image transition ground region between the background and foreground.

Entering the input vector from the input memory and at least one of the T template vectors from the template memory into a classifier device 18.

Classifying the input vector with respect to the entered template vectors by comparing the background and foreground and transition ground of the input vector with the background and foreground and transition ground of the entered template vector. The presence of transition ground in the input vector and the template vector produces a robust classification response with a more uniform correlation coefficient between repeated classifications of the same

4 input symbol. The classifier device may be a distance function classifier for comparing the input vector to each of the entered template vectors on an element by element basis and summing the comparisons to classify the input vector. Alternatively, the classifier device may be a neural network classifier which develops a learned data base therein in response to the entered template vectors to classify the input vector.

TRANSITION GROUND (FIGS. 3A 3B 3C and 3D)

In the conventional white/black print image of a character, the background region is the white paper surrounding the character and the foreground region is the deposited ink forming the character. The transition ground region is the edge boundary of the character between the background and foreground. The transition ground is lost during digitization of the print images to produce binary images. Binary pixel image 32A in binary bit map 30A (see "T" character of FIG. 3A) shows a sharp change in level of the data pixels between the background region and the foreground region without any transition ground.

In a greyscale pixel image of a printed image, transition ground is a halo of variable amplitude pixels around the foreground. The transition ground signal level progressively changes from the background level to the foreground level. Transition ground is a greyscale edge effect in an otherwise binary image. The transition ground around each template foreground is noise free and definite because of the absence of greyscale noise. Template pixel image 32B in bit map 30B (see "T" character of FIG. 3B) has a vertical transition ground 34B and a horizontal transition ground 36B, each of which is one pixel wide around the entire foreground. Each transition ground pixel has a level midway between the adjacent background level and the foreground level.

In a bit map embodiment where the background level is 0.00 (white) and the foreground level is 1.00 (black), the transition ground level is preferably 0.50. A library of input print images is scanned row by row to provide corresponding pixel images in a library of template bit maps. The level increases from white (background) to black (foreground) across the leading edge of each character stroke, and decreases from black to white across the trailing edge. Transition ground is generally reproducible between repeated scans of the same printed image, and represents data in the form of greyscale signal.

The transition ground in a print image may be expanded during the scanning of the print image to provide a pixel image of greater transition ground proportions. Image quantization effects produce a one pixel transition ground along each edge in the image. Quantization effects concern the "round off" error inherent in transforming a continuous print image of infinite resolution into a pixel image of finite resolution. The photo-sensor array (or matrix) in the scanner has a definite photo-diode size and spacing, and also definite scan raster rate across the paper. Vertical transition ground is traverse to the direction of paper advance (or scanner head advance) and is expanded during scanning by the quantization effects of the diode size and spacing. Horizontal transition ground is along the direction of paper advance and is expanded during scanning by the quantization effects of the raster rate.

Optical manipulation of the scanned print image may also expand the transition ground. Each diode sensor has a tiny light: collection lens which is positioned slightly off its focal distance relative to the printed image to provide an optical image of low quality focus. The thin transition ground in the print image becomes a wider multi-pixel transition ground in the bit map. The slight blurring of the print image functions as a low-pass optical filter, which preserves only the large image structures formed by the low spatial frequency components of the optical image. The finer details of the optical image formed by the higher spatial frequency components are anonymously merged into the blur. Preferably, the loss in quality of the optical focus is sufficient to prevent Morie patterns and undesirable "aliasing" effects in the bit map of the pixel image.

An array of non-symmetrical lenses may be employed to provide a transition ground of varying width. Template pixel image 32C in bit map 30C (see "T" character of FIG. 3C) has a vertical transition ground 34C which is three pixels (columns) wide, and a horizontal transition ground 36C which is two pixels (rows) wide. The three pixels in the vertical transition ground have stepped levels. For example, in the white background=0.00 and black foreground=1.00 embodiment, the steps may be 0.00 to 0.25 to 0.50 to 0.75 to 1.00. That is, the vertical transition ground pixels adjacent to the background have a level of 0.25, and the vertical transition ground pixels adjacent to the foreground have a level of 0.75. The middle vertical transition ground pixels have a level of 0.50. The two pixels in the horizontal transition ground have also stepped levels. The horizontal transition ground pixels adjacent to the background region may have a level of 0.33 and the horizontal transition ground pixels adjacent to the foreground region may have a level of 0.66.

The bit maps of unclassified symbols stored in the input memory include greyscale noise, which introduces random levels in the transition ground pixels. Input pixel image 32D in bit map 30D (see "T" character of FIG. 3D) has an uneven vertical transition ground 34D and horizontal transition ground 36D.

GREYSCALE NOISE

A primary source of greyscale noise is foreign matter greyscale (smudges, stains, lint etc.) deposited on the document within the text region. Paper greyscale (white noise) is caused by the pulp grain and other irregularities in the paper. Toner greyscale (black noise) is caused by the facets and other surface effects of individual particles of toner. Stray ink produces "toner splash" or pepper noise in the white background region adjacent to the image. Surplus ink coverage contributes to toner splash. In a poor coverage situation, missing ink produces "toner voids" or salt in the black foreground region.

Another major source of greyscale noise is due to mechanical movement such as scanner motion noise and uneven paper advance. Electronic greyscale is produced by thermal noise and electron dark current. The greyscale produced by these and other effects are noise not signal. The reduction or elimination of the greyscale noise will enhance the classification process.

BACKGROUND CLAMPING EMBODIMENT (FIG. 4)

Background clamping (and foreground clamping—see Foreground Clamping section) involves the removal of certain types of greyscale noise from the background region of a greyscale pixel image (or greyscale vector) in order to increase the correlation coefficient (decrease the distance) between input character and the matching template. Elimination of greyscale noise promotes the comparison of matching inputs and templates; but has a random effect in a non-match situation. Background clamping (and foreground clamping) is especially applicable to input vectors which are formed by raw "inoisy" data directly from the scanner. Template vectors are formed by "clean" processed data and contain much less greyscale noise. Model templates in which the date is hand entered are created under ideal condition; and may have zero greyscale noise. Background clamping requires additional steps which are executed prior to the classifying step. The background clamping steps are listed in FIG. 2 along with the general classification steps, and are described in detail below.

Identifying the background elements of the input vector (or template vector) having a numerical value within a predetermined background clamping range of numerical values. Each element in the vector defining the input character (or template character) represents a pixel within the pixel image of the character.

Clamping the numerical value of each of the identified background elements to a predetermined background clamping numerical level. Preferably, the predetermined clamping level is a level within the predetermined clamping range. The background clamping level may be a general background signal level determined by the level of the signal component of the numerical values of the background elements of the input vector.

Hyper Background Clamping

The portion of the numerical value of each background element beyond (below) the general background signal level defines a hyper background noise sub-component of the greyscale noise component of that element. Paper having reduced reflectivity, such as tinted paper or paper off-color with age, yields a slightly higher background signal level than paper close to 100% reflective (assuming full white is 0.00 and full black is 1.00). Light reflective lint particles, oily smudges, and watermarks et cetera which are more reflective than the paper, yield a lower signal level and contribute to hyper greyscale noises In the hyper clamp embodiment, the background clamping range is the range of numerical values determined by the hyper background noise sub-components. Clamping over the hyper background range eliminates the hyper background noise by clamping the entire range to the general background signal level.

Figure 4:
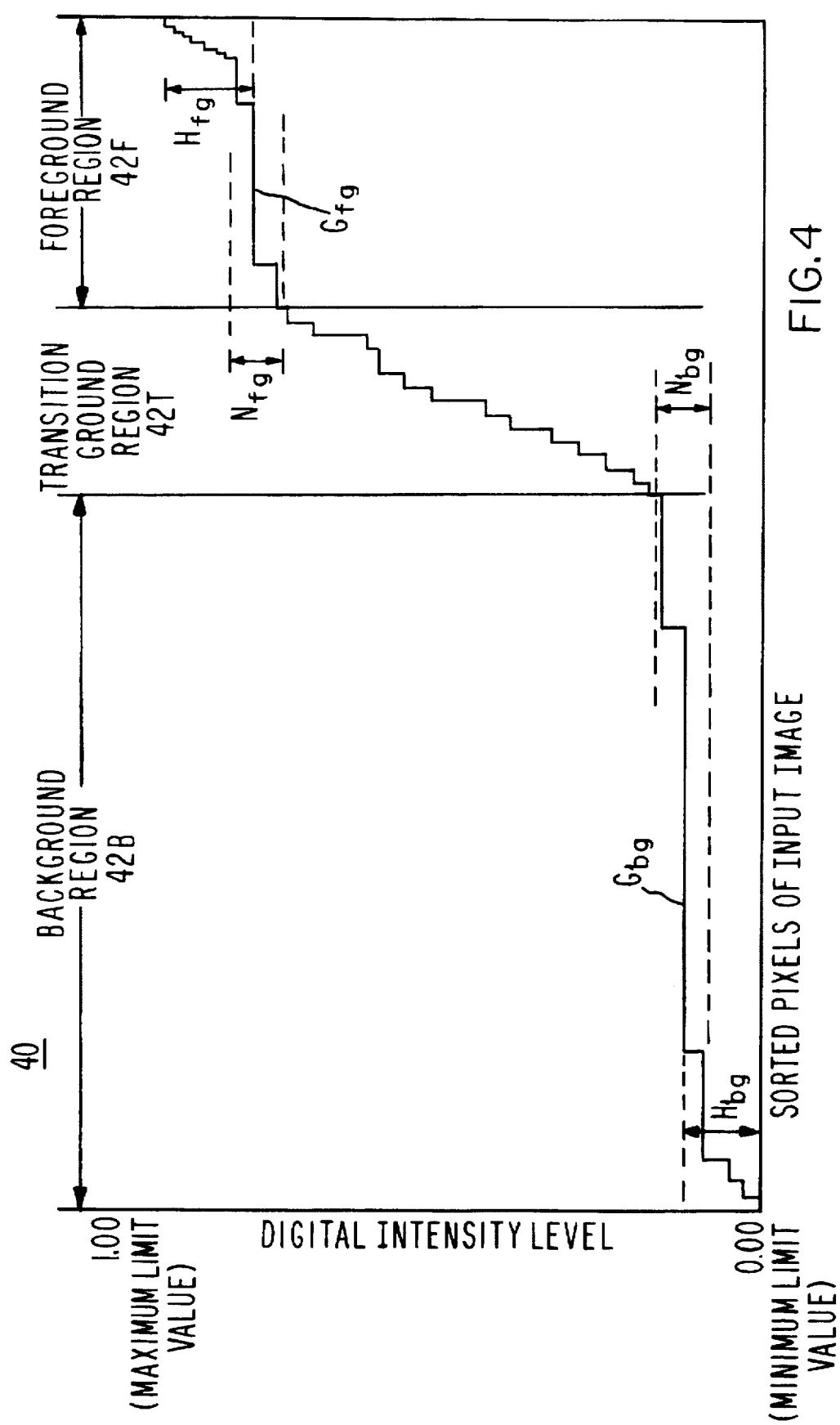
FIG. 4 is a sort chart showing the pixels in a pixel image sorted by intensity level to illustrate the clamping levels and clamping ranges.

The presence of hyper background noise and the effects of hyper clamping are visually depicted in sorted pixel chart 40 of a scanned input pixel image (see FIG. 4). Each pixel is sorted (X axis) by digital intensity level (Y axis) with the lowest levels towards the left forming white background region 42B and the highest levels towards the right forming black foreground region 42F. Transition ground region 42T between the background and foreground is the steep progressively rising region in the middle of the chart. The transition ground has been scan expanded (see Transition Ground section) and includes both vertical and horizontal greyscale transition pixels.

The general background level (indicated by $G_{bg}$) is shown in solid and dashed line. A corresponding general foreground level (indicated by $G_{fg}$) is also shown in solid and dashed line and is discussed in detail in the Foreground section. The slow upward stepping from left to right of the background region and the foreground region is due to uneven reflectivity in the light background and uneven absorption in the dark foreground. An additional upward stepping factor is pixel round-off error caused by the quantization of the greyscale in the toned image intensity of the print image to define the levels in the pixel data image. The height of the upward steps a reexaggerated in FIG. 4 for purposes of explanation. The hyper background range in the embodiment of FIG. 4 (indicated by $H_{bg}$) extends from the general background level to the level of maximum reflectivity (0.00). All background pixels from areas of the printed image more reflective than the paper are assigned the general background level.

Near Background Clamping

The portion of the numerical value of each element near the general background signal level defines a near background noise sub-component of the greyscale noise component of that element. Small variations in background reflectivity may be caused by many factors such as paper grain, fluctuations in scanning illumination, and round-off error. Deposited material having minor light absorption properties such as light colored dust and stains will reflect slightly less light than the background. These near deviations from background are greyscale noise. In the near clamping embodiment, the background clamping range is the range of numerical values determined by the near background noise sub-components. Clamping over the near background range eliminates the near background noise by clamping the entire near range to the general background signal level. The near background range in the embodiment of FIG. 4 (indicated by $N_{bg}$) extends on both sides of the general background level. All background pixels from areas of the printed image slightly more or slightly less reflective than the paper are assigned the general background level. In order to further reduce the greyscale noise in the pixel image, the background clamping range may include both the hyper background clamping range $H_{bg}$ plus the near background clamping range $N_{bg}$.

FOREGROUND CLAMPING EMBODIMENT (FIG. 4)

Foreground clamping is the removal of certain types of greyscale noise from the foreground region of a greyscale pixel image (or greyscale vector) in order to increase the correlation coefficient, and is very similar to background clamping. The foreground clamping steps are listed in FIG. 2 along with the general classification steps and the background clamping steps, and are described in detail below.

Identifying the foreground elements of the input vector (or template vector) having a numerical value within a predetermined foreground clamping range of numerical values. Each element in the vector defining the input character (or template character) represents a pixel within the pixel image of the character.

Clamping the numerical value of each of the identified foreground elements to a predetermined foreground clamping numerical level.

The foreground clamping level may be a general foreground signal level determined by the level signal or the component of the numerical values of the foreground elements of the input vector.

Hyper Foreground Clamping

The portion of the numerical value of each foreground element beyond (above) the general foreground signal level defines a hyper foreground noise sub-component of the greyscale noise component of that element. Dark color particles, and stains, which are more absorptive than the toner, yield a higher signal level and contribute to hyper greyscale noise. In the hyper clamp embodiment, the foreground clamping range is the range of numerical values determined by the hyper foreground noise sub-components. Clamping over the hyper foreground range eliminates the hyper foreground noise by clamping the entire range to the general foreground signal level.

General foreground level (indicated by $G_{fg}$) is shown in solid and dashed line. The hyper foreground range in the embodiment of FIG. 4 (indicated by $H_{fg}$) extends from the general foreground level to the level of minimum reflectivity (maximum absorption—1.00). All foreground pixels from areas of the printed image more absorptive than the toner are assigned the general foreground level.

Near Foreground Clamping

The portion of the numerical value of each element near the general foreground signal level defines a near foreground noise sub-component of the greyscale noise component of that element. Small variations in foreground reflectivity may result from non-uniformities in the condition of the toner (or ink) on the document scanned. Toner particles which are close to 100% light absorptive yield a slightly higher foreground signal level than toner having reduced light absorption, such as tinted toner or toner faded with age. New and very black toner appear as near foreground noise against the older toner. Office copiers and jet printers malfunction and produce uneven toner density. The ribbons on impact printers age and may not advance properly producing lighter and darker type.

In the near clamping embodiment, the foreground clamping range is the range of numerical values determined by the near foreground noise sub-components. Clamping over the near foreground range eliminates the near foreground noise by clamping the entire near range to the general foreground signal level. The near foreground range in the embodiment of FIG. 4 (indicated by $N_{fg}$) extends on both sides of the general foreground level. All foreground pixels from areas of the printed image slightly more or slightly less reflective than the paper are assigned the general foreground level.

In order to further reduce the greyscale noise in the pixel image, the foreground clamping range may include both the hyper foreground clamping range $H_{fg}$ plus the near foreground clamping range $N_{fg}$. In addition, the clamping method may include both background clamping (hyper and/or near) and foreground clamping (hyper and/or near) on the same pixel image.

CLAMPING PARAMETERS

The clamping levels of the background and foreground are entered into a suitable clamping device such as clamping comparators 16B and 16F at background level port $V_{bg}$ and foreground level port $V_{fg}$. The clamping ranges of the background and foreground are entered at background range port $R_{bg}$ and foreground range port $R_{fg}$. The level of each data pixel in the pixel image being clamped is compared to the clamping range(s). All levels which lie within either clamping range are set to the appropriate clamping level.

The clamping levels may be the general levels of input image (or template image), or some other level as the application requires. The background and foreground general levels may be determined by a greyscale analysis of pixel density verses level. The population distribution of the image pixels is bimodal with the lower peak defining the white background general level and the upper peak defining the black foreground general level. Alternatively, the clamping levels may be set at a predetermined fixed level. For example, in a simple 256 greyscale level embodiment, the white background level may be set at 50 levels above the minimum greyscale contract level and the black foreground level may be set at 50 levels below the maximum level.

Setting the background clamping level to zero permits a faster classifying cycle than a finite clamping level. If either the multiplier or the multiplicand of a product is zero then the product is zero. Therefore, all of the products generated by the classifying function involving a clamped-to-zero background pixel may be set to zero without actually performing the multiplication. Each omitted multiplication saves a few microseconds of processor time, and most classifying functions contain two or three multiplications for each pixel. The number of pixels employed depends on the resolution of the pixel image. The lowest resolution in common use has 2400 pixels (60 pixels high by 40 pixels wide), mostly background pixels which become zero through the clamping step. Higher resolutions have hundreds of thousands of pixels. Eliminating these background multiplications increases the speed of the of the classifying process. Setting the foreground clamping level to the whole integer one permits similar increase in speed. If the multiplier of a product is one then the product is the same as the multiplicand. Therefore, all of the products involving a clamped-to-one foreground pixel may be set to one without actually performing the multiplication.

The preferred width of a clamping range is selected to eliminate the maximum amount of greyscale noise with the minimum loss of transition ground (greyscale signal). A wide near background clamping range unfortunately includes some of the low end greyscale signal just above the general background level. Similarly a wide near foreground clamping range includes the high end greyscale signal just below the general foreground level. Narrower near clamping ranges do not include as much greyscale signal; but they also do not eliminate as much greyscale noise. The signal-to-noise ratio of the post-clamped pixel image is a consideration in selecting the clamping ranges. The pixel image remaining after the clamping should have higher signal-to-noise ratio than the pre-clamped image. The segment of the pixel information discarded through the clamping should contain predominately noise and have a lower signal-to-noise ratio than the pre-clamped image.

Image backgrounds generally contain more greyscale noise than image foregrounds; and background clamping therefore promotes input-template matching more effectively than foreground clamping. The area of the background is typically many times larger than the foreground. That is, a printed page is mostly white with spaced black characters. Background clamping therefore affects many more pixels in the pixel image. In addition, most sources of noise involve foreign substances having at least some light absorptive pigment or color. Dust and stains are rarely "snow white". This predominance of pigment affects the white background more severely than the black background.

RELATED CLAMPING STEPS

The pixel sort chart shows that the numerical value of each level of the signal components of the input vector is between a minimum limit value and a maximum limit value. The numerical value of the background elements are closer to one of the limit values, and the numerical values of the foreground elements are closer to the other one of the limit values. In the FIG. 4 embodiment, the minimum limit is 0.00 and the maximum limit is 1.00. The background is depicted as white and closer to the minimum limit. However, other limits may be employed, produced by various normalization and calibration procedures, and the background may be light or dark and closer to either of the limit values. The general background level may be either limit value.

Preferably, the background general level and the foreground general level of the input pixel image are identical to the general levels of the template image. The general levels may be normalized by a suitable calibration step such as adjusting the scanner gain control 12G to set the input pixel general levels at the same level as the template pixel general levels. Normalizing the general levels also normalizes the correlation coefficients to facilitate analysis of the classification results. The classification method may include the related steps of:

Setting the general background level of the input vector and the entered template vector to the same general background level, and Setting the general foreground level of the input vector and the entered template vector to the same general foreground level.

Either the input general levels may be set to the same levels as the template general levels, or the template general levels may be set to the same levels as the input general levels. Preferably, the general levels of the input image are adjusted to the same levels as the template image. Adjusting the scanner gain to set the general background level of the input image may nullify the effect of any illumination drift in the scanner light source or any off-color in the paper carrying the printed image. Similarly, adjusting the general foreground level of the input image may nullify the effect of faded or colored toner.

The classification method may also include the related step of sorting the pixels of the input character (and the template character) in order of levels for assisting in the clamping step:

Sorting the elements of the input vector (and the template vector) in order of the numerical values thereof prior to the classifying step.

A sort chart of the template image would reveal that the template image has less noise and round-off error than the input image data. All pixels having the same level will be adjacent in the sorted sequence, and form groups having a common multiplier in the distance function calculations. The multiplication step will have the same multiplier for each group, and may proceed through an entire group without entering a new multiplier.

Both the input vector and the template vector may be clamped to remove greyscale noise and enhance the correlation coefficient. Preferably, the input clamping range and clamping levels are the same as the template clamping range and clamping levels. That is, the predetermined template clamping range conforms to the predetermined input clamping range, and the predetermined template clamping level conforms to the predetermined input clamping level.

INDUSTRIAL APPLICABILITY

It will be apparent to those skilled in the art that the objects of this invention have been achieved by providing an OCR classification method which employs background and foreground binary data and transition ground greyscale data. The OCR method has a "robust" response with less variation in correlation coefficients between classifications of the same input symbol, with minimal loss of image signal. Greyscale noise beyond the background level (or beyond the foreground level) is "clamped" to the background level (or to the foreground level) to reduce noise. In addition, greyscale noise near the background level (or near the foreground level) is "clamped" to the background level (or to the foreground level).

CONCLUSION

Clearly various changes may be made in the structure and embodiments shown herein without departing from the concept of the invention. Further, features of the embodiments shown in the various figures may be employed with the embodiments of the other figures.

Therefore, the scope of the invention is to be determined by the terminology of the following claims and the legal equivalents thereof.

We claim as our invention:

1. An OCR (optical character recognition) method of classifying an input image vector of an unclassified whole character with respect to a library of template image vectors of pre-classified characters, said method comprising the steps of:

provndng a library of template image vectors of pre-classified characters each in the form of a sequence of template elements, each template element having a numerical value representing the image intensity level of a corresponding element within the pre-classified character defined by the template vector, said template elements including image background elements, image foreground elements, and image transition ground elements that are situated between image background elements and image foreground elements and are caused by a progressive change from background intensity level to foreground intensity level;

providing an input image vector of an unclassified whole character in the form of a sequence of input elements, each input element having a numerical value representing an image intensity level signal component corresponding to an element within the unclassified character, said input elements being from the group of elements comprising image background elements, image foreground elements, and image ground elements that are situated between image background elements and image foreground elements and are caused by a progressive change from background intensity level to foreground intensity level;

entering the input vector and at least one of the template vectors into a classifier means; and classifying the input vector with respect to the entered template vectors by comparing numerical values of elements of the input vector with numerical values of elements of entered template vectors.

2. The OCR method of claim 1, wherein the classifier means is a distance function.classifier for comparing the input vector to each of the entered template vectors on an element by element basis and summing the element comparisons to classify the input vector.

3. The OCR method of claim 1, wherein the classifier means is a neural network classifier which develops a learned data base therein in response to the entered template vectors to classify the input vector.

4. The OCR method of claim 1, further comprising, before the classifying step, the additional steps of:

identifying the elements of the input vector having a numerical value within a predetermined background clamping range of numerical values; and clamping the numerical value of each of the identified elements to a predetermined background clamping numerical value.

5. The OCR method of claim 4, wherein the predetermined clamping level is within the predetermined clamping range.

6. The OCR method of claim 4, wherein the background clamping level is a general background signal level determined by the levels of the signal components of the background elements of the input vector, the portion of the numerical value of each background element below the general background signal level defines a hyper background noise sub-component of a greyscale noise component of that element, the background clamping range is a hyper background clamping range determined by the hyper background noise sub-components, and clamping the numerical value of elements within the hyper background range eliminates hyper background noise by clamping the numerical value of elements within the hyper background range to the general background signal level.

7. The OCR method of claim 6, wherein the portion of the numerical value of each element near the general background signal level defines a near background noise sub-component of the greyscale noise component of that element, the background clamping range is the hyper background clamping range plus a near background clamping range determined by the near background noise sub-components, and the clamping of the hyper background range together with the near background range eliminates hyper background noise plus near background noise by clamping elements within the hyper background range and the near background range to the general background signal level.

8. The OCR method of claim 4, wherein the background clamping level is a general background signal level determined by the levels of the signal component of the background elements of the input vector, the portion of the numerical value of each element near the general background signal level defines a near background noise sub-component of a greyscale noise component of that element, the background clamping range is a near background clamping range determined by the near background noise sub-components, and clamping elements within the near background range eliminates near background noise by clamping the near background range to the general background signal level.

9. The OCR method of claim 4, wherein the intensity of each element of the signal components of the input vector is between a minimum limit value and a maximum limit value, with the intensities of the background elements closer to one of the limit values than to the other one of the limit values, and the intensities of the foreground elements closer to the other one of the limit values than to said one of the limit values.

10. The OCR method of claim 9, wherein the background clamping level is a general background signal level determined by the intensity level of the signal component of the background elements of the input vector.

11. The OCR method of claim 9, wherein the background clamping level has the numerical value of 0.00.

12. The OCR method of claim 9, wherein the background clamping level is a predetermined number of levels away from the minimum limit value.

13. The OCR method of claim 1, further comprising, before the classifying step, the additional steps of:

identifying the elements of the input vector having a numerical value within a predetermined foreground clamping range of numerical values; and clamping the numerical value of each of the identified elements to a predetermined foreground clamping numerical value.

14. The OCR method of claim 13, wherein the foreground clamping level is a general foreground signal level determined by the level signal component of the numerical values of the foreground elements of the input vector, the portion of the numerical value of each foreground element above the general foreground signal level defines a hyper foreground noise sub-component of a greyscale noise component of that element, the foreground clamping range is a hyper foreground clamping range determined by the hyper foreground noise sub-components, and clamping elements within the hyper foreground range eliminates hyper foreground noise by clamping elements within the hyper foreground range to the general foreground signal level.

15. The OCR method of claim 14, wherein the portion of the numerical value of each element near the general foreground signal level defines a near foreground noise sub-component of the greyscale noise component of that element, the foreground clamping range is the hyper foreground clamping range plus a near foreground clamping range determined by the near foreground noise sub-components, and the clamping of elements within the hyper foreground range together with the near foreground range eliminates hyper foreground noise plus near foreground noise by clamping elements within the hyper foreground range and the near foreground clamping range to the general foreground signal level.

16. The OCR method of claim 13, wherein the foreground clamping level is a general foreground signal level determined by the level signal component of the numerical values of the foreground elements of the input vector, the portion of the numerical value of each element near the general foreground signal level defines a near foreground noise sub-component of a greyscale noise component of that element, the foreground clamping range is a near foreground clamping range determined by the near foreground noise sub-components, and clamping elements within the near foreground range eliminates near foreground noise by clamping elements within the near foreground range to the general foreground signal level.

17. The OCR method of claim 13, wherein the intensity of each element of the level signal components of the input vector is between a minimum limit value and a maximum limit value, with the intensities of the background elements closer to one of the limit values, and the intensities of the foreground elements closer to the other one of the limit values.

18. The OCR method of claim 17, wherein the foreground clamping level is a general foreground signal level determined by the intensity level of the signal component of the foreground elements of the input vector.

19. The OCR method of claim 17, wherein the foreground clamping level is 1.00.

20. The OCR method of claim 17, wherein the foreground clamping level is a predetermined number of levels away from the maximum limit value.

21. The OCR method of claim 1, further comprising, before the classifying step, the additional steps of:
identifying the elements of the input vector having a numerical value within a predetermined background clamping range of numerical values;
clamping the numerical value of each of the identified elements to a predetermined background clamping numerical value within the predetermined background clamping range;
identifying the elements of the input vector having a numerical value within a predetermined foreground clamping range of numerical values; and
clamping the numerical value of each of the identified elements to a predetermined foreground clamping numerical value within the predetermined foreground clamping range.

22. The OCR method of claim 21, wherein the background clamping level is a general background signal level determined by the level signal component of the numerical values of the background elements of the input vector, the portion of the numerical value of each background element below the general background signal level defines a hyper background nose sub-component of a greyscale noise component of that element, the background clamping range is a hyper background clamping range determined by the hyper background noise sub-components, and clamping elements within the hyper background range eliminates hyper background noise by clamping elements within the hyper background range to the general background signal level.

23. The OCR method of claim 22, wherein the portion of the numerical value of each element near the general background signal level defines a near background noise sub-component of the greyscale noise component of that element, the background clamping range is the hyper background clamping range plus a near background clamping range determined by the near background noise sub-components, and the clamping of the hyper background range together with the near background range eliminates hyper background noise plus near background noise by clamping the elements within the hyper background range and the near background clamping range to the general background signal level.

24. The OCR method of claim 21, wherein the background clamping level is a general background signal level determined by the level signal component of the numerical values of the background elements of the input vector, the portion of the numerical value of each element near the general background signal level defines a near background noise sub-component of a greyscale noise component of that element, the background clamping range is a near background clamping range determined by the near background noise sub-components, and clamping elements within the near background range eliminates near background noise by clamping elements within the near background range to the general background signal level.

25. The OCR method of claim 21, wherein the foreground clamping level is a general foreground signal level determined by the level signal component of the numerical values of the foreground elements of the input vector, the portion of the numerical value of each foreground element above the general foreground signal level defines a hyper foreground noise sub-component of a greyscale noise component of that element, the foreground clamping range is a hyper foreground clamping range determined by the hyper foreground noise sub-components, and clamping elements within the hyper foreground range eliminates hyper foreground noise by clamping elements within the hyper foreground range to the general foreground signal level.

26. The OCR method of claim 25, wherein the portion of the numerical value of each element near the general foreground signal level defines a near foreground noise sub-component of the greyscale noise component of that element, the foreground clamping range is the hyper foreground clamping range plus a near foreground clamping range determined by the near foreground noise sub-components, and the clamping of the hyper foreground range together with the near foreground range eliminates hyper foreground noise plus near foreground noise by clamping elements within the hyper foreground range and the near foreground clamping range to the general foreground signal level.

27. The OCR method of claim 21, wherein the foreground clamping level is a general foreground signal level determined by the level signal component of the numerical values of the foreground elements of the input vector, the portion of the numerical value of each element near the general foreground signal level defines a near foreground noise subcomponent of a greyscale noise component of that element, the foreground clamping range is a near foreground clamping range determined by the near foreground noise subcomponents, and clamping elements within the near foreground range eliminates near foreground noise by clamping elements within the near foreground range to the general foreground signal level.

28. The OCR method of claim 1, further comprising, before the classifying step, the additional steps of:

identifying the elements of the input vector having a numerical value within a predetermined input clamping range of numerical values;

clamping the numerical value of each of the identified input elements to a predetermined input clamping numerical value;

identifying the elements of the template vectors having a numerical value within a predetermined template clamping range of numerical values; and clamping the numerical value of each of the identified template elements to a predetermined template clamping numerical value.

29. The OCR method of claim 28, wherein the predetermined template clamping range is the same as the predetermined input clamping range, and the predetermined template clamping level is the same as the predetermined input clamping level.

30. The OCR method of claim 1, further comprising, before the classifying step, the additional step of:

sorting the elements of the input vector in order of the numerical values thereof.

31. The OCR method of claim 30, further comprising, after the input vector sorting step, the additional step of:

sorting the elements of the template vector in order of the numerical values thereof.

32. The OCR method of claim 1, wherein numerical values of the background elements of the input vector determine a general background input signal level, numerical values of the foreground elements of the input vector determine a general foreground input signal level, numerical values of the background elements of the entered template vector determine a general background template signal level, and numerical values of the foreground elements of the entered template vector determine a general foreground template signal level.

33. The OCR method of claim 32, further comprising, before the classifying step, the additional steps of:

setting the general background signal level of the input vector and the entered template vector to the same general background signal level; and setting the general foreground signal level of the input vector and the entered template vector to the same general foreground signal level.

34. The OCR method of claim 32, further comprising, before the classifying step, the additional steps of:

setting the general background signal level of the input vector to the general background signal level of the entered template vector; and setting the general foreground signal level of the input vector to the general foreground signal level of the entered template vector.

35. The method of claim 1, wherein the input elements include image background elements, image foreground elements, and transition around elements.

36. The OCR method of claim 1, wherein an input image is input-scanned by a scanner, and said input image vector is extracted from said input image.

* * * * *